United States Patent [19]
Julian et al.

[11] Patent Number: 5,905,440
[45] Date of Patent: May 18, 1999

[54] ACOUSTIC EMISSION SEVERANCE DETECTOR AND METHOD

[75] Inventors: John Julian, Richland; James R. Skorpik; Joe C. Harris, both of Kennewick, all of Wash.

[73] Assignees: Battelle Memorial Institute, Richland; Lamb-Weston, Inc., Kennewick, both of Wash.

[21] Appl. No.: 08/995,237

[22] Filed: Dec. 19, 1997

[51] Int. Cl.$^6$ ................................................. G08B 21/00
[52] U.S. Cl. ...................... 340/680; 340/679; 340/683; 83/22; 83/62.1; 83/72; 83/74
[58] Field of Search ..................... 340/680, 679, 340/683; 83/22, 24, 62, 62.1, 72, 74, 81, 209, 210, 211, 307, 370, 371, 372, 954, 955; 73/104, 659, 660

[56] References Cited

U.S. PATENT DOCUMENTS

| | | | |
|---|---|---|---|
| 3,109,468 | 11/1963 | Lamb et al. | 146/78 |
| 4,429,578 | 2/1984 | Darrel et al. | 73/659 |
| 4,636,779 | 1/1987 | Thomas et al. | 340/680 |
| 4,636,780 | 1/1987 | Thomas et al. | 340/680 |
| 4,707,687 | 11/1987 | Thomas et al. | 340/680 |
| 4,764,760 | 8/1988 | Bedard et al. | 340/680 |
| 4,806,914 | 2/1989 | Thomas et al. | 340/680 |
| 4,831,365 | 5/1989 | Thomas et al. | 340/680 |
| 4,864,294 | 9/1989 | Fukuhisa | 340/870.01 |
| 4,884,449 | 12/1989 | Nishimoto et al. | 73/660 |
| 4,918,616 | 4/1990 | Yoshimura et al. | 364/507 |
| 4,942,387 | 7/1990 | Thomas | 340/683 |
| 5,009,141 | 4/1991 | Julian et al. | 83/857 |
| 5,266,929 | 11/1993 | Carmichael et al. | 340/680 |
| 5,293,803 | 3/1994 | Foster | 83/865 |
| 5,298,889 | 3/1994 | Diei et al. | 340/680 |
| 5,343,623 | 9/1994 | Cole et al. | 30/304 |
| 5,407,265 | 4/1995 | Hamidieh et al. | 340/680 |
| 5,421,226 | 6/1995 | Mendenhall | 83/22 |
| 5,568,755 | 10/1996 | Mendenhall | 83/402 |

*Primary Examiner*—Daniel J. Wu
*Assistant Examiner*—Toan N. Pham
*Attorney, Agent, or Firm*—Paul W. Zimmerman

[57] ABSTRACT

The invention has utility generally for monitoring any part for severance of the part. The invention is specifically useful for monitoring severance of a tension blade in a tension blade grid. For general monitoring of a part, the apparatus has wireless connection between the sensing unit and the control unit. The wireless connection is achieved with a transmit/receive unit using radiofrequency power transfer for electrical power and using infrared transmitters and receivers for signal transfer. For food processing, specifically for a vegetable cutting method employing at least one tension blade in a first tension blade grid through which vegetables are passed for cutting the vegetables wherein the at least one tension blade is severed during the cutting, the invention provides for diverting the vegetables to a second tension blade grid. Diversion is accomplished with an acoustic emission sensor acoustically coupled to the at least one tension blade so that during the vegetable cutting, the acoustic emission sensor detects acoustic energy from tension blade severance. The acoustic energy is converted to an electronic signal that is compared in a microprocessor to a threshold. In a severance condition, an actuator receives an alarm signal from the microprocessor and diverts the vegetables to the second tension blade grid.

20 Claims, 9 Drawing Sheets

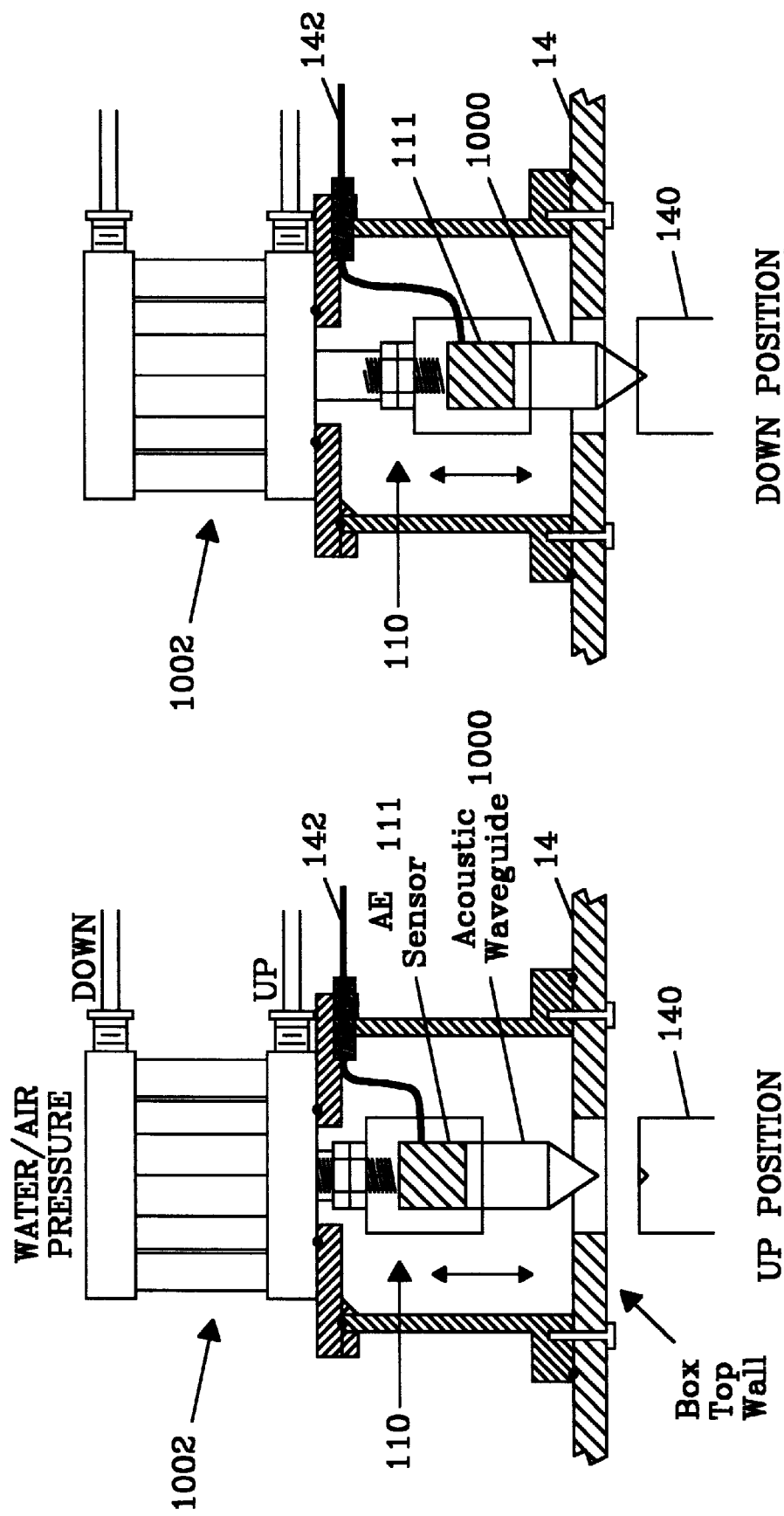

ACOUSTIC EMISSION SEVERANCE DETECTOR AND METHOD

FIELD OF THE INVENTION

The present invention relates generally to an apparatus and method for detecting severance of a production component. More specifically, the present invention is for detecting severance of at least one blade in a grid of tension blades. As used herein, the term "severance" is defined to mean complete separation via breakage, in other words complete failure of a part to maintain its integrity. The term "severance" specifically excludes partial severance via a crack or crack propagation.

BACKGROUND OF THE INVENTION

Acoustic monitoring of parts for incipient failure is industrially well known and has been used for bridges, nuclear power plants and aircraft. Typically, the acoustic equipment is configured with an acoustic emission sensor electrically hard-wire connected to a controller.

Monitoring of cutters for cutter breakage is also well known and used especially for rotary cutters on machine tools, for example milling machines, drills, saws, and rotary shears. For example, U.S. Pat. No. 4,636,779, ACOUSTIC DETECTION OF TOOL BREAK EVENTS IN MACHINE TOOL OPERATIONS, uses an accelerometer to detect tool breaks.

U.S. Pat. No. 4,918,616, TOOL MONITORING SYSTEM uses an acoustic emission sensing unit for detecting a tool failure in a tool machine. In this system, an artificial signal generating unit generates a predetermined artificial tool failure signal simulating the acoustic emission signal obtained in an actual failure of the tool for comparison to actual acoustic emission received during operation of the tool. When the actual acoustic emission matches the artificial signal, then a tool break is confirmed.

U.S. Pat. No. 4,884,449, APPARATUS FOR DETECTING A FAILURE IN BEARINGS, uses an acoustic emission sensor which detects acoustic emission from a bearing. Signals indicative of power of the acoustic emission are passed through a bandpass filter which passes only signals in the range of from 100 kHz to 500 kHz. A comparator compares the passed signals with a predetermined threshold value and outputs any event signals which exceeds the threshold value. A computer receives the event signals from the comparator, then determines time intervals or duration of the event signals. The number of event signals are counted in each time interval and total count compared to a predetermined threshold count value to determine a failure in the bearing.

U.S. Pat. No. 4,707,687, DETECTOR TO DISCRIMINATE BETWEEN TOOL BREAK ACOUSTIC SIGNATURES AND SPIKY NOISE, recognizes that in some machining conditions the background noise in an acoustic cutting tool break detection system is a low mean level with fairly dense high amplitude noise spikes. A common tool break vibration signature is the sudden appearance of a dense high amplitude (spiky) noise. Digital signal pattern recognition logic uses an up/down counter to reject the noise on the basis of its lower spike density while alarming on such a tool break signature. Preprocessed vibration signal samples are tested against a detection threshold and an alarm generated when amplitudes above the threshold amplitude exceeds a preset count.

In the food processing industry, specifically vegetable processing by cutting, more specifically potato cutting, a self-supporting blade grid has been used. Potatoes are moved past the self-supporting blade grid and sliced as shown in U.S. Pat. No. 5,009,141. An advance in throughput was realized by putting the potatoes in water and pumping the water/potato stream through the self-supporting blade grid as shown in U.S. Pat. No. 3,109,468, and FIG. 1. A pipe 10 carries potatoes 12 into a box or housing 14. The housing 14 contains one or more self supporting blade grid(s) 16 wherein the potatoes 12 are cut into slices 18. Occasionally a foreign object, for example a rock, would be passed with the potatoes to the self-supporting blade grid whereupon the rock would deform the self-supporting blade grid and become trapped therein. Incoming potatoes would stack up behind the rock. By implementing a pressure transducer (not shown) to detect the clog, the pressure transducer provided a signal upon clogging whereupon (see FIG. 2) an actuator (not shown) moves the housing 14 containing a spare blade grid 20 from a clogged position A (indicated by dashed lines) to an unclogged position B thereby diverting potatoes to the spare self-supporting blade grid 20 and taking the first self-supporting blade grid 16 out of service, permitting an operator to remove the deformed and clogged self-supporting blade grid 16 and replace it with a new one.

Yet a further advance was realized upon introducing much thinner blades maintained by tension as described in U.S. Pat. No. 5,343,623 as a tension blade grid having an advantage of less waste. However, with the thin blades only 0.08 inch (0.20 cm) thick, upon being struck by a rock the thin blade would sever rather than deform, the rock would pass and incoming potatoes would not be cut by the severed blade thereby permitting irregular cuts of potatoes to pass the tension blade grid. Further, the thin tension blades are more affected by the varying loads compared to self supporting blades. The varying loads are imposed as vegetables are alternately in contact then no contact with the tension blades thereby creating a time varying stress that leads to fatigue of the tension blades. Thus, even absent a foreign object such as a rock, one or more tension blades may fail by fatigue permitting irregular cuts to pass the tension blade grid. Stationing an inspector to watch the output of the blade grid for irregular cuts is expensive and undesirable.

Accordingly, there is a need in the acoustic emission industry for an apparatus wireless combination of sensor unit and transmit/receive station. Further in the food processing industry, there is a need for a fully reliable detector of a malfunction of a tension blade from which a signal may be used to divert the incoming vegetables, especially potatoes, as was done when using the self-supporting blade grid.

SUMMARY OF THE INVENTION

The invention has utility generally for monitoring any part for severance of the part. The invention is specifically useful for monitoring severance of a tension blade in a tension blade grid.

For general monitoring of a part, the apparatus has
  (a) a sensor unit having
    (i) an acoustic emission sensor acoustically coupled to said part for receiving acoustic energy from said part into said acoustic emission sensor during use of said part, and converting said acoustic energy into a first electrical signal, said acoustic emission sensor detecting acoustic energy,
    (ii) an optical signal generator for receiving said first electrical signal and generating an optical signal,
    (iii) a first optical window for transmitting the optical signal from the sensor unit, (iv) a radiofrequency power receiver for receiving radiofrequency energy and converting the radiofrequency energy to electricity for operating the acoustic emission sensor and the optical signal generator;

(b) a transmit/receive station spaced apart from said sensor unit having
  (i) a second optical window for receiving said optical signal from said first optical window together with an optical transducer for converting the optical signal to an electrical signal,
  (ii) a radiofrequency power transmitter for converting electricity into the radiofrequency energy and transmitting the radiofrequency energy to the radiofrequency power receiver; and (c) a control unit for providing the electricity to the radiofrequency power transmitter, and for receiving the electrical signal from the optical transducer having
  (i) a microprocessor within the control unit for analyzing the electrical signal by comparison to a threshold.

For food processing, specifically for a vegetable cutting method employing at least one tension blade in a first tension blade grid through which vegetables are passed for cutting the vegetables wherein the at least one tension blade severs, the invention provides for diverting the vegetables to a second tension blade grid. According to the present invention, (a) an acoustic emission sensor is acoustically coupled to the at least one tension blade for receiving acoustic energy from the at least one tension blade into the acoustic emission sensor during the vegetable cutting, the acoustic emission sensor detecting acoustic energy. The acoustic energy is converted into an electronic signal. The acoustic emission sensor is connected to (b) a microprocessor for analyzing the electronic signal by comparison to a threshold; and (c) an actuator receives an alarm signal from the microprocessor when the electronic signal exceeds the threshold and diverts the vegetables to the second tension blade grid.

The acoustic energy may be of any frequency or any frequency range, but preferably has a frequency in a range greater than 100 kHz to avoid external mechanical noise.

As used herein, the threshold is a combination of an amplitude limit and a time duration of the electronic signal in excess of said amplitude limit.

It is an object of the present invention to provide an acoustic emission severance detector for a tension blade grid used for cutting vegetables.

It is another object of the present invention to provide an acoustic emission detector having a wireless connection between a sensing unit and a control unit, for any structural monitoring.

It is a further object to provide an acoustic emission severance detector for a tension blade grid used for cutting vegetables having a wireless connection between a sensing unit and a control unit.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 10a is a cross section of a retractable embodiment tested in Example 3.

FIG. 10b is a cross section of the retractable embodiment in the extended operating position.

DESCRIPTION OF THE PREFERRED EMBODIMENT(S)

Figure 1:
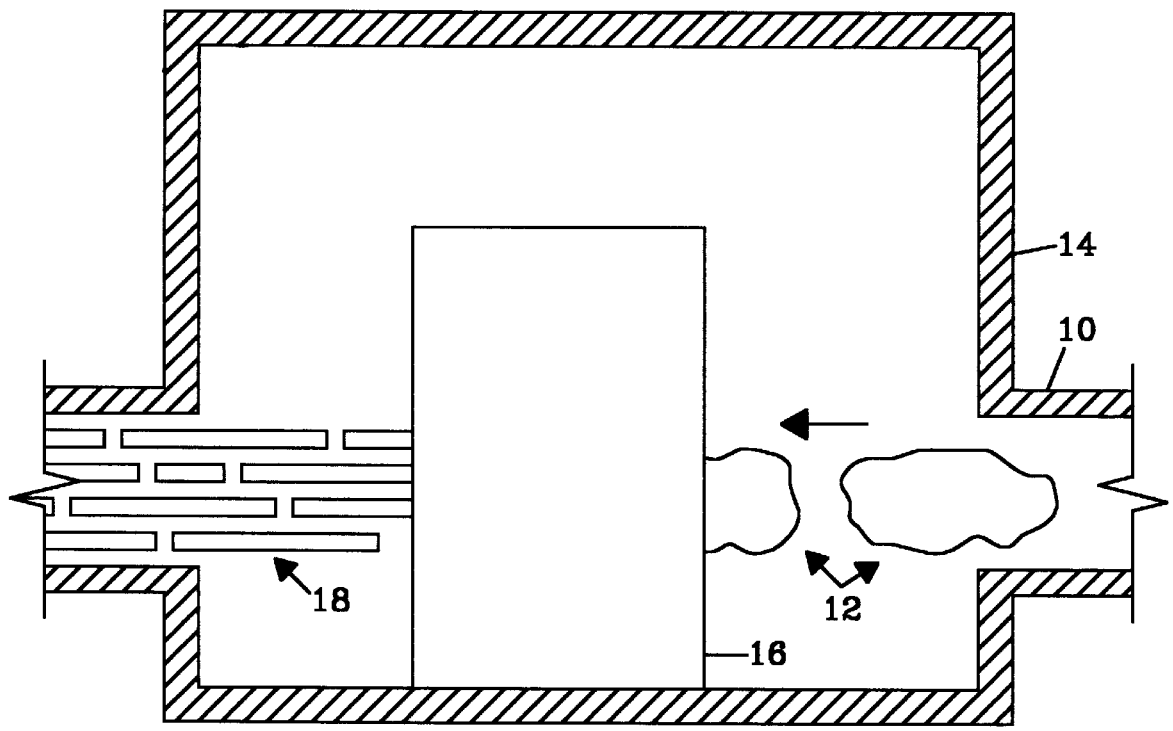
FIG. 1 is a cross section of a vegetable slicer or cutter known in the prior art.
Figure 2:
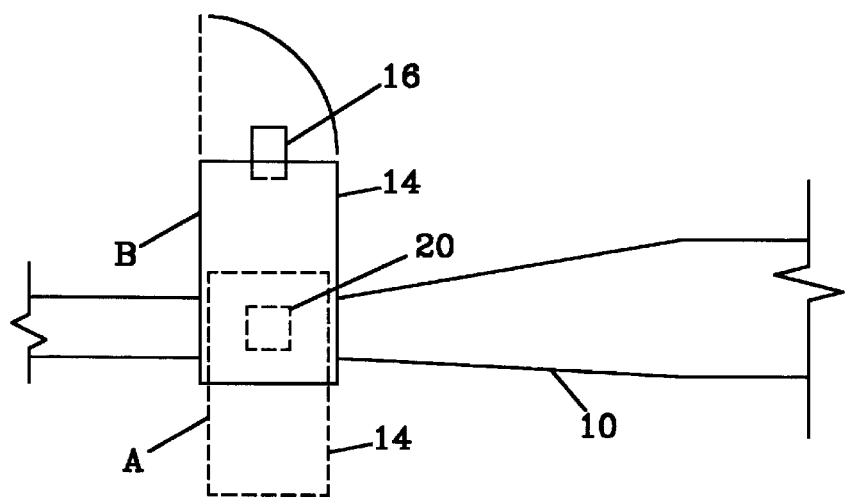
FIG. 2 is a plan view of a vegetable slicer or cutter that is clogged being moved from service and a new slicer or cutter moved into service as is known in the prior art.
Figure 3:
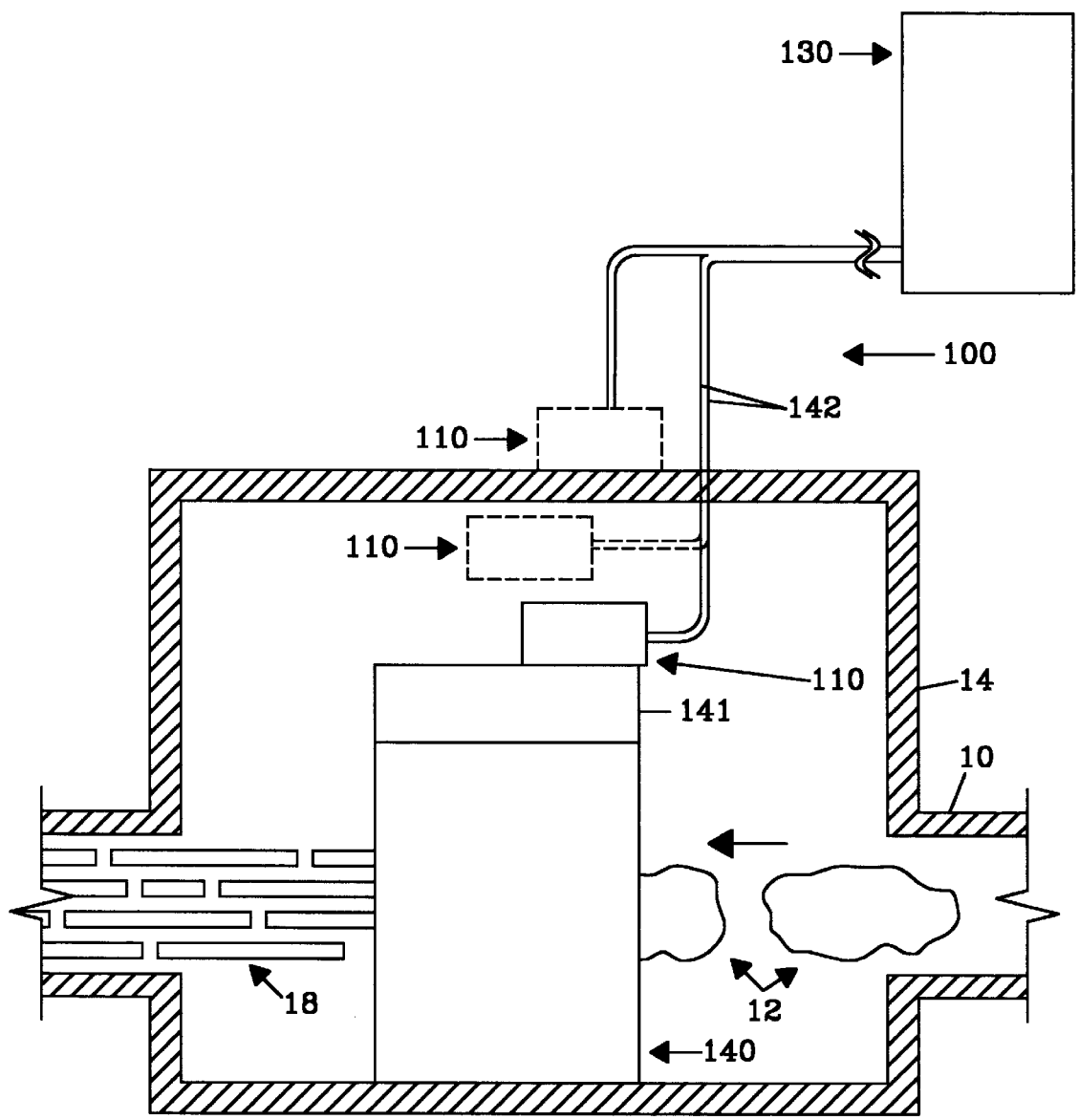
FIG. 3 is a cross section of a vegetable slicer with an acoustic severance detector according to the present invention.

Referring to FIG. 3, the acoustic emission severance detector 100 has a sensor unit 110, and a control unit 130. The sensor unit 110 is acoustically coupled to a tension blade grid unit 140, specifically preferably to a tension bar 141 that holds the tension blades (not shown) within the tension blade grid unit 140. The sensor unit 110 may be in contact with the housing 14. However, in this position, the sensor unit 110 is less reliable than when it is connected directly to the tension blade grid unit 140.

The acoustic emission severance detector 100 continuously monitors the tension blade grid unit 140. Upon a severance or break of an internal blade, the sensor unit 110 sends a signal to the control unit 130 that sends a severance signal to plant personnel for action. The action is to move a new tension blade grid unit into place then replace the damaged tension blade grid unit and continue cutting. Moving the tension blade grid unit may be manual or remotely controlled via an actuator (not shown). When the damaged tension blade grid unit is out of service, it may be replaced. In the preferred embodiment, the sensor unit 110 is attached to the tension blade grid unit 140, therefore requiring that the sensor unit 110 is also replaced. For the embodiment of FIG. 3 wherein the sensor unit 110 is connected by wires 142 to the control unit 130, disconnecting those wires 142 is an added step that complicates replacement of the tension blade grid unit 140.

Figure 4:
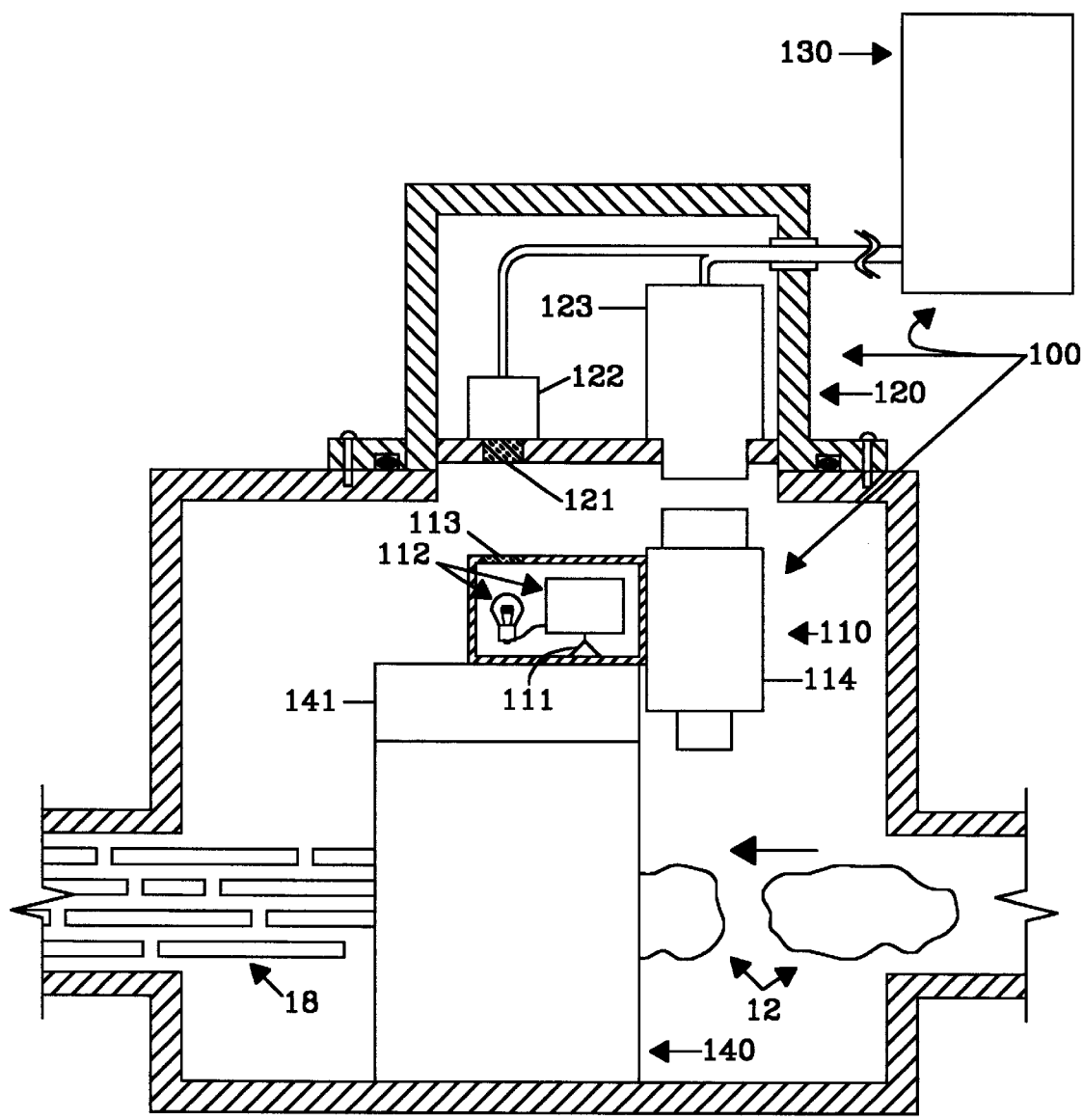
FIG. 4 is a cross section of a vegetable slicer with an acoustic severance detector with a wireless connection.

A preferred embodiment is shown in FIG. 4 wherein the power and signal coupling between the sensor unit 110 and the control unit 130 is wireless. The wireless coupling is achieved through a transmit/receive station 120. By having a wireless interface between the sensor unit 110 and the control unit 130, replacement of the tension blade grid unit/sensor unit assembly is simplified compared to a wire connection interface.

The sensor unit 110 houses
  (i) an acoustic emission sensor 111 for receiving acoustic energy and converting the acoustic energy into a first electrical signal. For the wireless coupling, the sensor unit further houses
  (ii) an optical signal generator 112 for receiving the first electrical signal and generating an optical signal, (iii) a first optical window 113 for transmitting the optical signal from the sensor unit, and (iv) a radiofrequency power receiver 114 for receiving radiofrequency energy and converting the radiofrequency energy to electricity for operating the acoustic emission sensor 111 and the optical signal generator 112.

Again, for wireless coupling, the transmit/receive station 120 houses (i) a second optical window 121 for receiving the optical signal from the first optical window 113 together with an optical transducer 122 for converting the optical signal to an electrical signal, and (ii) a radiofrequency power transmitter 123 for converting electricity into the radiofrequency energy and transmitting the radiofrequency energy to the radiofrequency power receiver 114.

The control unit 130 provides the electricity to the radiofrequency power transmitter 123, and/or receives the electrical signal from the optical transducer 122. The control unit 130 has (i) a microprocessor (not shown) for analyzing the electrical signal by comparison to a threshold. Upon a severance, the control unit activates an alarm with both a flashing lamp (not shown) and programmable logic controller (plant computer) compatible signals. The alarm may be cleared and rearmed either manually or remotely through the microprocessor.

It will be recognized by those of skill in the art of acoustic emission severance detection that the wireless combination of sensor unit 110 and transmit/receive station 120 apparatus and method of the present invention is not specifically limited to food processing, and may be applied to other industrial cutting operations or structural monitoring applications.

Figure 5A:
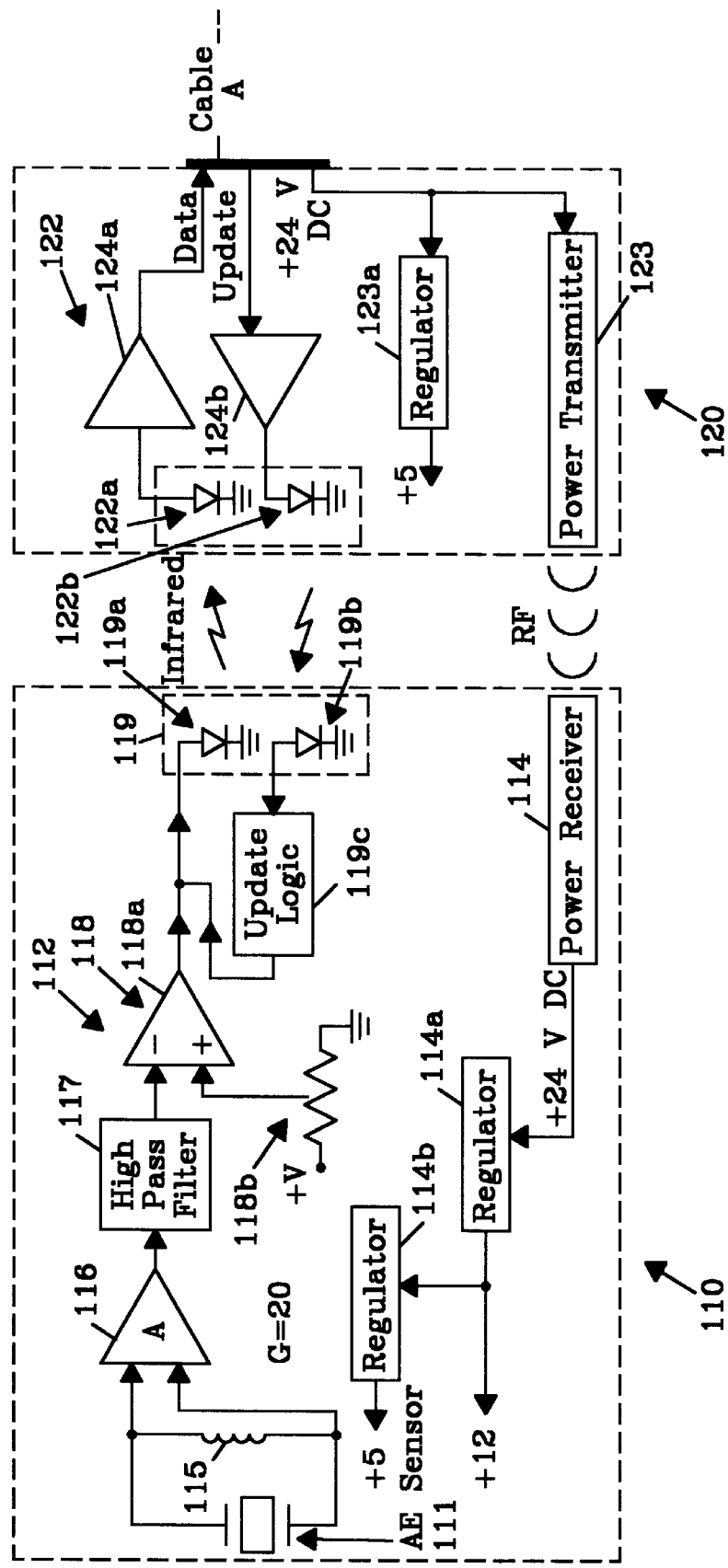
FIG. 5a is an electronic block diagram of the sensor unit and the transmit/receive unit.

A system block diagram is shown in FIG. 5a. The sensor unit 110 has the radiofrequency power receiver 114 (manufactured by MESA Systems CO., Framingham Mass.) that provides 24 V DC to a 12 V DC regulator 114a that provides electricity to the analog components 116, 117, 118, 118b and a 5 V DC regulator 114b that provides electricity to the digital components 119, 119a, 119b, 119c. The acoustic emission sensor 111 is connected to the optical signal generator 112 which has an inductor 115 in parallel with the acoustic emission sensor 111 connected to an amplifier 116. The acoustic emission sensor 111 may be any acoustic emission sensor operating in the range from greater than 100 kHz to about 1000 kHz, preferably in the range of from about 450 kHz to about 750 kHz, for example a model D9202B manufactured by Physical Acoustics Corporation, Princeton, N.J. A high pass filter 117 permits high frequency signals to the threshold detector 118. The threshold detector has a comparator 118a, and a threshold set screw 118b. Upon installation of an acoustic severance detector, it is tested to select the threshold set screw setting. Once, set, it is rarely, if ever, reset. Signals in excess of the threshold activate the infrared lamp 119. (Infrared lamps or optical transducers useful in the present invention are, for example model HSDL-1100, manufactured by Hewlett Packard, Mountain View, Calif.). In a preferred embodiment, the infrared lamp 119 includes a transmission lamp 119a and a receiver lamp 119b wherein the receiver lamp 119b in combination with a conversion circuit 119c may produce a test signal independently of the acoustic emission sensor 111 that will light the transmission lamp 119a. With these, it is possible for an operator to determine whether or not the infrared signal is passing through the windows 113, 121. If not, corrective action of either cleaning or replacement may be done.

The transmit/receive unit 120 has the radiofrequency power transmitter 123 and optical transducer 122. A 5 V DC power regulator 123a connects to the digital components 122a, 122b, 124a, 124b. The optical transducer 122 has an optical receive transducer 122a connected to an amplifier 124a for transmitting a data signal. In a preferred embodiment, a window check signal is amplified through a window check signal amplifier 124b that excites a check lamp 122b. Cable A connects the transmit/receive unit 120 to the control unit 130. Cable B is to a mirror image transmit/receive unit (not shown) because it is necessary to have one acoustic emission severance detector 100 for each of the tension blade grids 16, 20 in the housing 14.

Figure 5B:
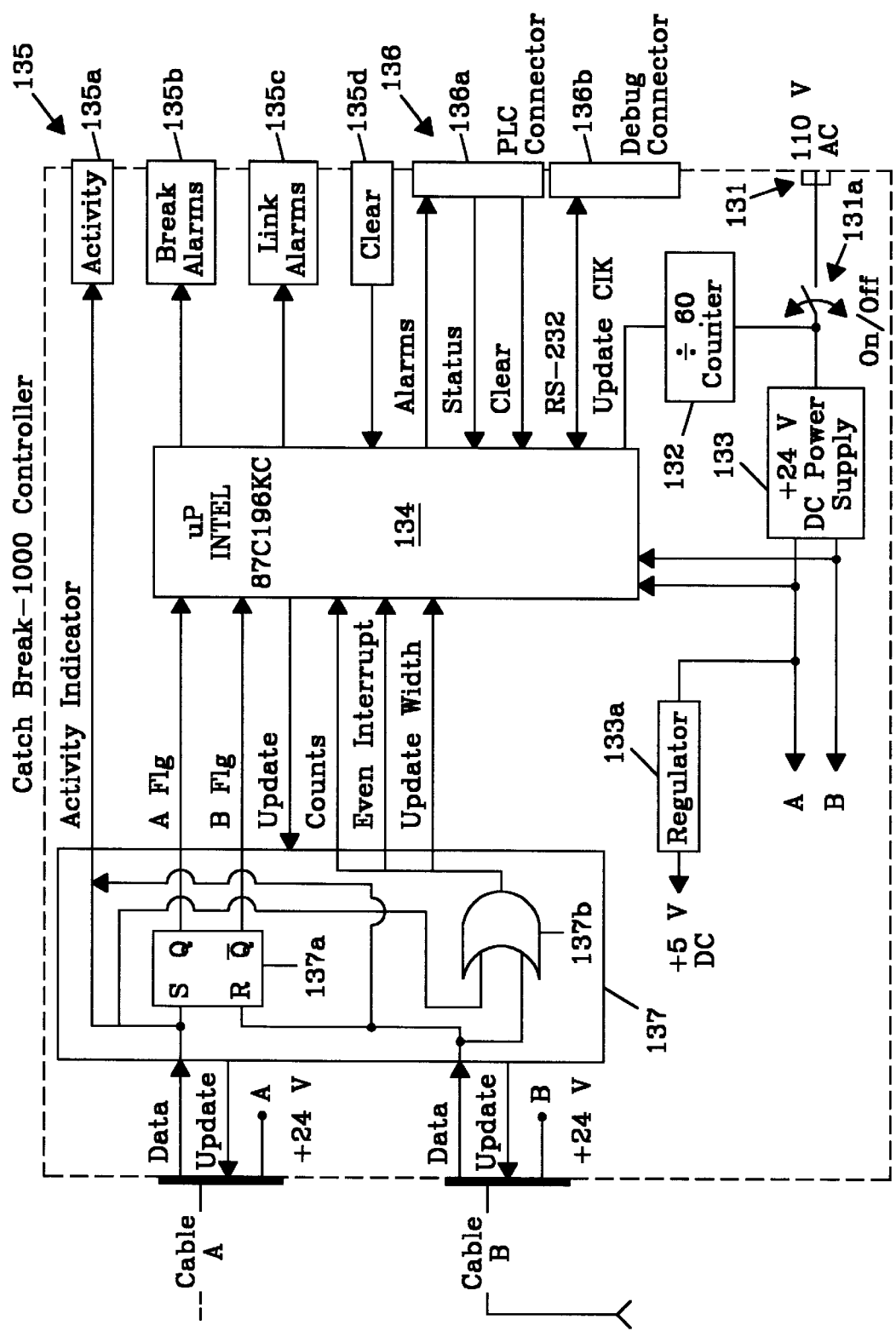
FIG. 5b is an electronic diagram of the control unit.

The control unit 130 (FIG. 5b) has an electrical power connection 131 to standard 110 VAC. The electrical power connection goes through a switch 131a then both to a counter 132 and a 24 VDC power supply 133 which provides 24 VDC electricity to the transmit/receive unit 120. It also provides 24 VDC electricity to cables A and B. A 5 VDC regulator 133a provides electricity to the digital components including but not limited to items 132, 134, 137. The electricities from the counter 132 and from the 24 VDC power supply 133 are fed to a microprocessor chip 134. Visible lights 135 indicate activity 135a, break alarm 135b, and link alarm 135c. Break alarm indicates a severed tension blade. Link alarm indicates a loss of infrared signal. A button 135d is provided for manual clearing of alarms. Electronic signals corresponding to the lights 135 are also provided through connectors 136. The plant computer connector 136a passes alarms to the plant computer, and receives clear signals to clear alarms from the plant computer. Status received from the plant computer is operating status of a production line. The debug connector 136b sends and receives infrared check signals. A logic interface 137 makes electronic signals compatible between the microprocessor 134 and the transmit/receive unit 120. Within the logic interface 137 are a flip-flop 137a and an OR gate 137b.

Figure 6:
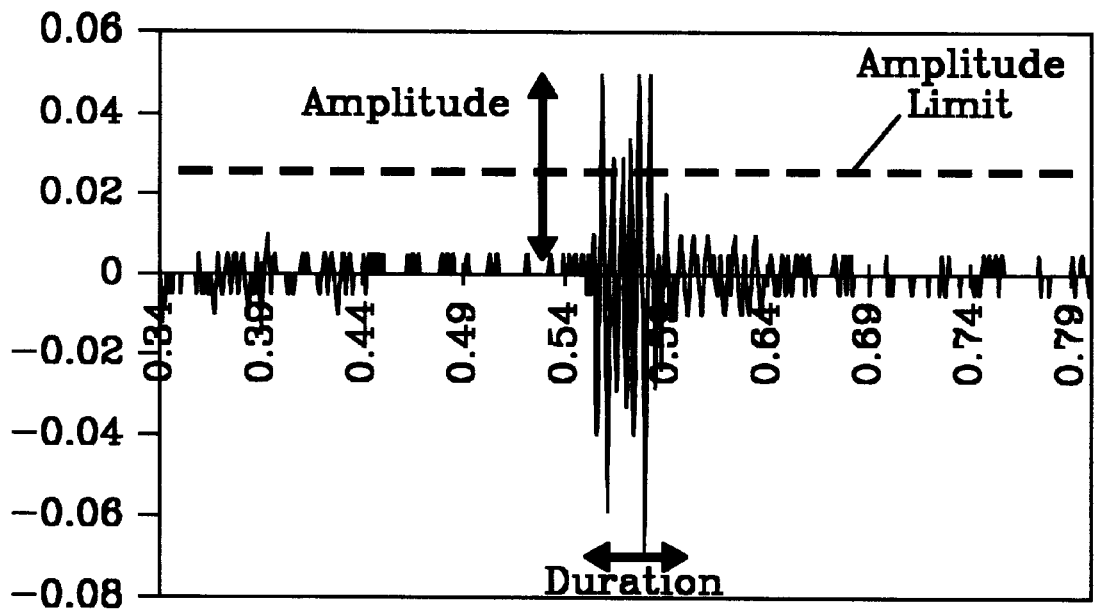
FIG. 6 is a graph defining amplitude limit (threshold) and duration.

The threshold is illustrated in FIG. 6 as an amplitude limit. The sounds emanating from the part with frequencies greater than 100 kHz are monitored in time by amplitude. When a signal has an amplitude exceeding an amplitude limit, time duration is measured as well. When both the amplitude and duration exceed their set points, a severance condition is identified. Because of the transient nature of the sound from a severance, it is necessary that the duration set point be within the total duration of the severance sound. In a preferred embodiment, the amplitude limit is determined by an induced severance upon installation, then set by a potentiometer and not readily accessible for adjustment after installation. The duration limit is set by an operator through the microprocessor.

While an acoustic emission sensor preferably has a frequency response greater than 100 kHz, a more preferred frequency response is greater than 300 kHz, and most preferred from about 400 kHz to about 1000 kHz. Frequencies above about 1000 kHz are less preferred because (1) acoustic energy at those frequencies does not propagate as far through the materials of the tension blade grid unit and the vegetables and water, and (2) acoustic emission sensors at higher frequencies are of limited commercial availability.

Figure 7:
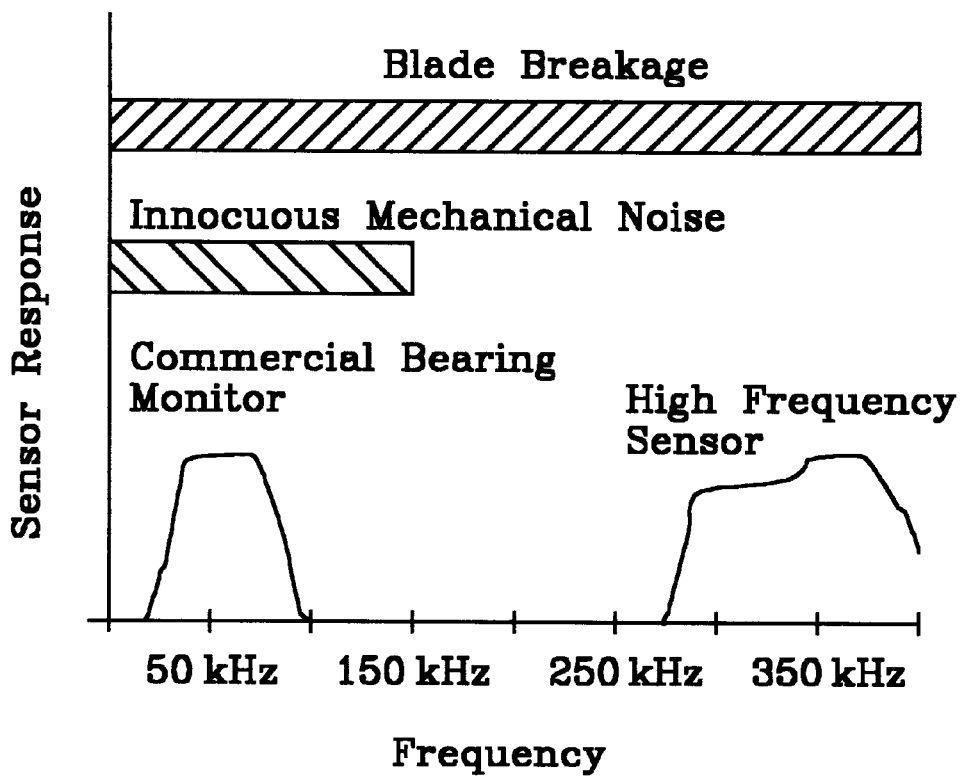
FIG. 7 is a graph defining frequency range.

In a food processing plant with background mechanical and electrical noise, in order to "hear" or detect the sound of a tension blade breaking or severing, it is necessary to distinguish the sever sound from the background noise. Background noise includes noise or vibration from pumps, motors and actuators, vegetables (especially potatoes) slamming into or impacting the cutting blades and/or sidewalls of flow passages, small clods, roots or pebbles striking blades or sidewalls of flow passages, etc. FIG. 7 shows the broad range of frequencies produced upon sever or breakage of a tension blade. In addition, the range of frequencies of background noise is shown. A commercially available acoustic emission bearing monitor "hears" in the range from 0–100 kHz, well within the frequency range of background noise. A sensor made according to the present invention with a frequency range of 300–750 kHz, preferably 500 kHz to 750 has the high frequency response. Because this frequency response is above background frequencies and within the frequencies of a severed tension blade, the sensor is sufficiently reliable for routine use.

Figure 8:
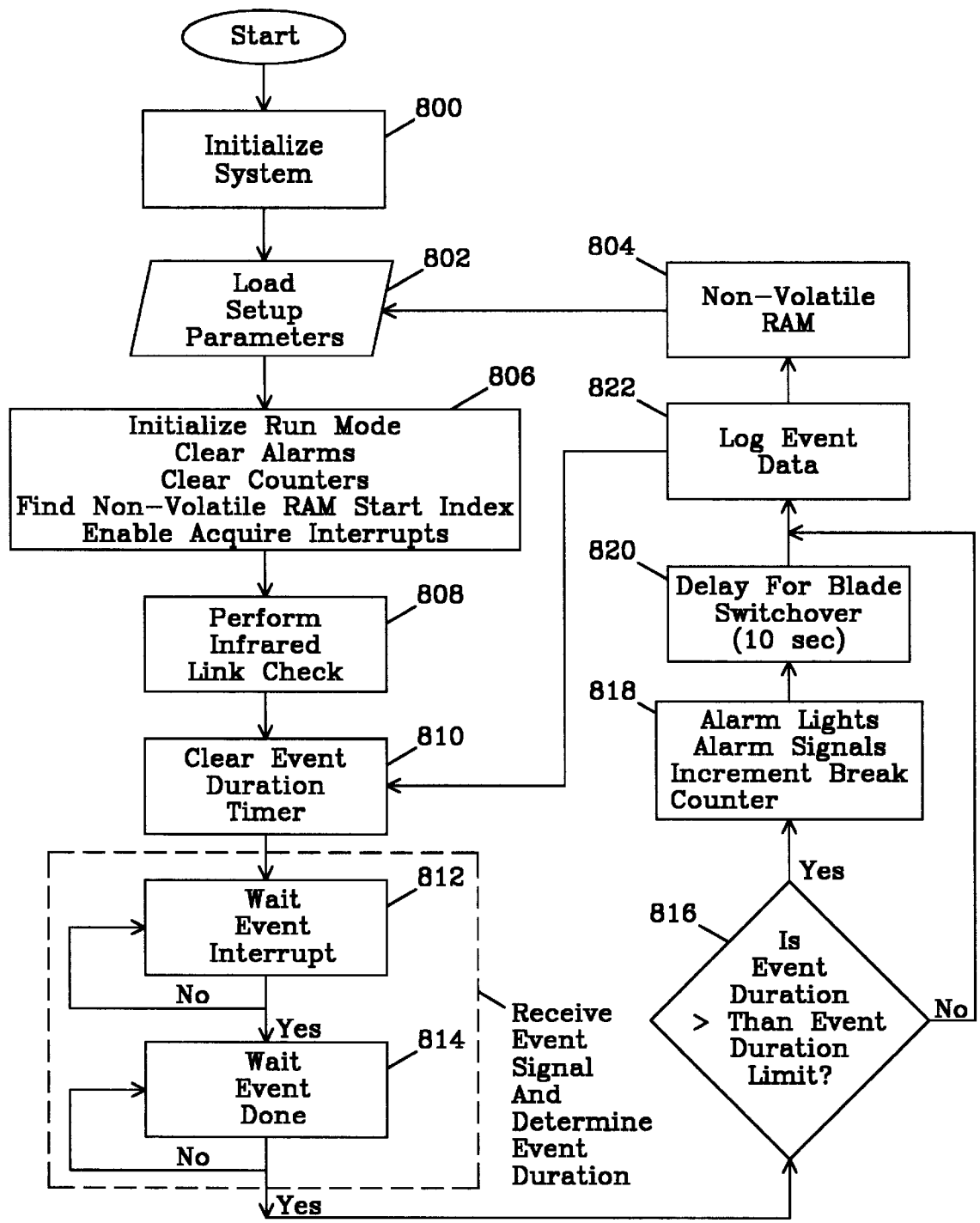
FIG. 8 is a flow chart for system software.
Figure 9:
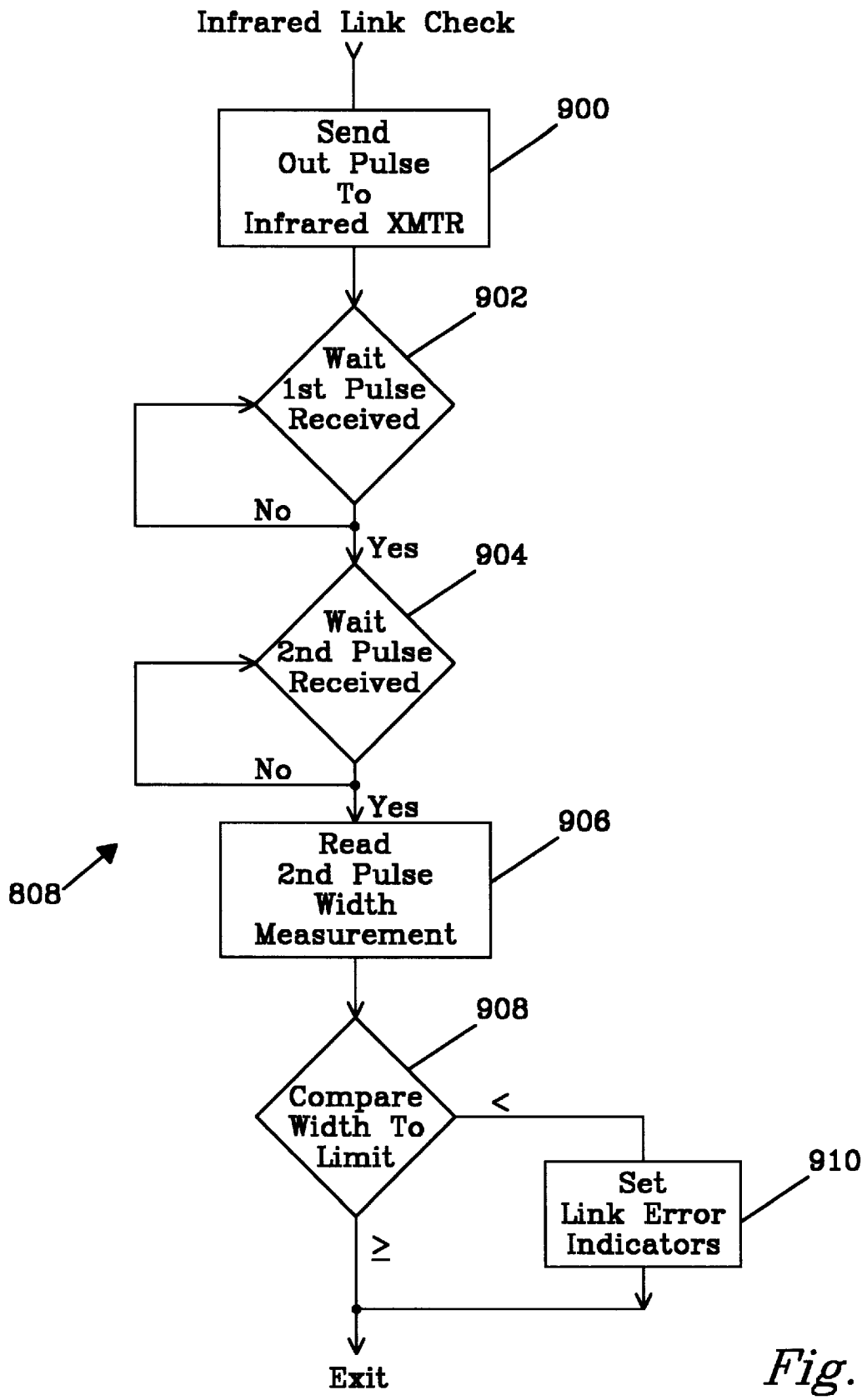
FIG. 9 is a flow chart for infrared link check software.

Software logic for the microprocessor 134 is shown in FIG. 8, and FIG. 9. In FIG. 8, the system is initialized 800 by clearing counters, clearing alarms, and setting memory registers to zero. Next, setup parameters are loaded 802 from non-volatile RAM 804 in the control unit 130. Run mode is initialized 806 by clearing alarms and counters, finding the non-volatile RAM start index and enabling acquire interrupts. The infrared link check is performed 808 to insure that the infrared signal is obtainable through the windows 113, 121. The event duration counter is cleared 810. A wait event interrupt 812 is used to continuously monitor the event signal circuit. Upon receipt of a signal in excess of the amplitude limit or threshold, event duration is determined by a wait event done 814. Upon determination of a completed event, the event duration is compared to the duration limit 816. If the event duration exceeds the event duration limit, then a severance has occurred and signals are sent for alarm lights and electronic signals as well as incrementing a severance or break counter 818. Usually, the plant will immediately actuate the housing to place a new tension blade grid 20 into position. During this actuation, there is tremendous mechanical noise from moving the housing 14 and water hammer. Accordingly, further monitoring of the new tension blade grid unit is delayed 820 to avoid spurious signals during actuation. A delay of about 10 seconds is preferred. After the event, event data is logged 822, the event duration counter is cleared 810 and monitoring continues.

The infrared link check 808 is done upon start up and at a predetermined time interval. The time interval may be set by the user and is typically about 30 minutes. Referring to FIG. 9, a pulse is sent to the check lamp 122b via check pulse instruction 900. The system waits for the first pulse return 902. When the first pulse return is received, a second pulse is sent 904 for the actual infrared link check. Upon receipt of the second pulse return, its width is measured 906 and compared to a limit 908. If the second return pulse is greater than the limit, monitoring continues. If the second return pulse is less than the limit, then a link error alarm condition is noted 910.

Example 1

An experiment was conducted with a commercially available bearing monitor to determine whether a tension blade break may be detected therewith.

A commercially available acoustic emission bearing failure monitor, model MCM from SPM Instrument, Inc. Marlborough, Conn. having an acoustic range from 0–100 kHz, was used externally of the housing 14 solely for determining its tension blade break detection performance. It was not connected to any alarm, switch or hydraulic actuator for moving the blades. Data were obtained through a data logger. Testing of the acoustic emission bearing failure monitor (0–100 kHz) proved only partially reliable because mechanical noise in the range of 0–100 kHz interfered with the tension blade break signal as illustrated in FIG. 7. Because background noise is not necessarily constant, there are times during which the commercially available acoustic emission bearing monitor may detect a severance of a tension blade. However, during times of increased background noise, the commercially available acoustic emission bearing monitor failed to detect severance of the tension blade and is therefore insufficiently reliable for routine use.

Example 2

Experiments were conducted to determine a reliable position of the sensor with respect to the tension blade. As in Example 1, the sensor was connected to a data logger, not connected to an alarm, switch or hydraulic actuator. A tension blade assembly is shown in FIG. 3. Placing the acoustic emission sensor 110 on the exterior wall of the box 14 permits acoustic coupling through the box, through the water, to the tension blade grid unit 140. However, tests showed this position to be unreliable because the complex acoustic path degraded the blade severance signal so that it became difficult to reliably detect a severance in the selected frequency range. Placing the acoustic emission sensor 110 in the water between the wall of the box 14 and the tension blade grid unit 140, was also found to be unreliable for the same reason. It was hypothesized that the acoustic coupling between the tension blade(s) and/or tension blade grid unit 140 and the water was acoustically inefficient or incomplete. Placing the acoustic emission sensor 110 on the tension blade grid unit 140, specifically on a tension bar holding the tension blades proved to provide the most reliable signals from severance events. It was hypothesized that the acoustic path through the metal of the tension blades to the connecting tension bar was acoustically efficient or substantially complete. With the acoustically efficient acoustic path through the metal, increased acoustic detection sensitivity was realized permitting optimization of operating frequency and electronic amplification for severance detection and suppression of unwanted background noise.

Example 3

An experiment was conducted to determine overall reliability of the acoustic emission severance detector. The apparatus for this experiment is shown in FIG. 10a and FIG. 10b and was installed at Lamb Weston's Boardman, Oreg. processing plant for approximately 16 months. Signals were collected in a data logger and were not connected to an alarm, switch or hydraulic actuator. In this embodiment, the sensor unit 110 has an acoustic emission sensor 111 mounted on an acoustic waveguide 1000. A linear actuator 1002 moves the sensor unit 110 so that the acoustic waveguide 1000 is in contact with the tension blade grid unit 140 (FIG. 10b). When it is necessary to remove the tension blade grid unit 140, the linear actuator 1002 raises the sensor unit 110 out of the way (FIG. 10a).

During this time, three blade severances were detected and fifteen false calls were recorded. There were no undetected blade severances. It is believed that the false calls were a result of vibration causing relative motion and impact between the tension blade grid unit 140 and the acoustic waveguide 1000 thereby generating false signals.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. For a vegetable cutting method employing at least one tension blade in a first tension blade grid through which vegetables are passed for cutting said vegetables wherein at least one tension blade is severed during the cutting, a method for detecting a severance of the at least one tension blade, comprising the steps of:
   (a) acoustically coupling a sensor unit having an acoustic emission sensor to said at least one tension blade, said acoustic emission sensor detecting acoustic signals;
   (b) receiving acoustic energy from said at least one tension blade into said acoustic emission sensor during said vegetable cutting, and converting said acoustic energy into an electronic signal; and
   (c) analyzing said electronic signal by comparison to a threshold.

2. The method as recited in claim 1, further for diverting said vegetables to a second tension blade grid, further comprising the steps of:
   (d) sending an alarm signal when said electronic signal exceeds said threshold; whereupon
   (e) diverting said vegetables to said second tension blade grid.

3. The method as recited in claim 1, wherein said threshold is a combination of an amplitude limit and a time duration of said electronic signal in excess of said amplitude limit.

4. The method as recited in claim 1, wherein said sensor unit has a wire coupling to a control unit.

5. The method as recited in claim 1, wherein said sensor unit has a wireless coupling to a control unit through a transmit/receive unit.

6. For a vegetable cutting apparatus employing at least one tension blade in a first tension blade grid through which vegetables are passed for cutting said vegetables wherein said at least one tension blade is severed during the cutting, an apparatus for detecting a severance of the at least one tension blade, comprising:
   (a) a sensor unit having an acoustic emission sensor acoustically coupled to said at least one tension blade for receiving acoustic energy from said at least one tension blade into said acoustic emission sensor during said vegetable cutting, and converting said acoustic energy into a first electric signal, said acoustic emission sensor detecting acoustic energy; and
   (b) a control unit having a microprocessor connected to said sensor unit for analyzing said electronic signal by comparison to a threshold.

7. The apparatus as recited in claim 6 for further diverting said vegetables to a second tension blade grid, further comprising:
   (c) an actuator for receiving an alarm signal from said microprocessor when said electronic signal exceeds said threshold and diverting said vegetables to said second tension blade grid.

8. The apparatus as recited in claim 6, wherein said threshold is a combination of an amplitude limit and a time duration of said electronic signal in excess of said amplitude limit.

9. The apparatus as recited in claim 6, wherein said sensor unit has a wire coupling to the control unit.

10. The apparatus as recited in claim 6, wherein said sensor unit has a wireless coupling to the control unit through a transmit/receive unit.

11. The apparatus as recited in claim 6, wherein said sensor unit has, in addition to the acoustic emission sensor;
   (i) an optical signal generator for receiving said first electrical signal and generating an optical signal;
   (ii) a first optical window for transmitting the optical signal from the sensor unit; and
   (iii) a radiofrequency power receiver for receiving radiofrequency energy and converting the radiofrequency energy to electricity for operating the acoustic emission sensor and the optical signal generator for a wireless coupling to a transmit/receive station.

12. The apparatus as recited in claim 11, wherein the transmit/receive station comprises:
   (i) a second optical window for receiving said optical signal from said first optical window together with an optical transducer for converting the optical signal to an electrical signal; and
   (ii) a radiofrequency power transmitter for converting electricity into the radiofrequency energy and transmitting the radiofrequency energy to the radiofrequency power receiver.

13. The apparatus as recited in claim 12, wherein the control unit provides the electricity to the radiofrequency power transmitter, and receives the electrical signal from the optical transducer.

14. For a vegetable cutting apparatus employing at least one tension blade in a first tension blade grid through which vegetables are passed for cutting said vegetables wherein said at least one tension blade is severed during said cutting, an apparatus for detecting a severance of the at least one tension blade, comprising:
   (a) a sensor unit having
      (i) an acoustic emission sensor acoustically coupled to said at least one tension blade for receiving acoustic energy from said at least one tension blade into said acoustic emission sensor during said vegetable cutting, and converting said acoustic energy into a first electric signal, said acoustic emission sensor detecting acoustic energy;
      (ii) an optical signal generator for receiving said first electrical signal and generating an optical signal,
      (iii) a first optical window for transmitting the optical signal from the sensor unit,
      (iv) a radiofrequency power receiver for receiving radiofrequency energy and converting the radiofrequency energy to electricity for operating the acoustic emission sensor and the optical signal generator;
   (b) a transmit/receive station spaced apart from said sensor unit having
      (i) a second optical window for receiving said optical signal from said first optical window together with an optical transducer for converting the optical signal to an electrical signal,
      (ii) a radiofrequency power transmitter for converting electricity into the radiofrequency energy and transmitting the radiofrequency energy to the radiofrequency power receiver; and
   (c) a control unit for providing the electricity to the radiofrequency power transmitter, and for receiving the electrical signal from the optical transducer having
      (i) a microprocessor within the control unit for analyzing the electrical signal by comparison to a threshold.

15. The apparatus as recited in claim 14 for further diverting said vegetables to a second tension blade grid, further comprising:

(d) an actuator for receiving an alarm signal from said microprocessor when said electronic signal exceeds said threshold and diverting said vegetables to said second tension blade grid.

16. The apparatus as recited in claim 14, wherein said acoustic emission sensor has a frequency in a range greater than 100 kHz.

17. For a vegetable cutting apparatus employing at least one tension blade in a first tension blade grid through which vegetables are passed for cutting said vegetables wherein said at least one tension blade is severed during the cutting, an apparatus for diverting said vegetables to a second tension blade grid, comprising:
  (a) a sensor unit having
    (i) an acoustic emission sensor acoustically coupled to said at least one tension blade for receiving acoustic energy from said at least one tension blade into said acoustic emission sensor during said vegetable cutting, and converting said acoustic energy into a first electric signal, said acoustic emission sensor detecting acoustic energy;
    (ii) an optical signal generator for receiving said first electrical signal and generating an optical signal,
    (iii) a first optical window for transmitting the optical signal from the sensor unit,
    (iv) a radiofrequency power receiver for receiving radiofrequency energy and converting the radiofrequency energy to electricity for operating the acoustic emission sensor and the optical signal generator;
  (b) a transmit/receive station spaced apart from said sensor unit having
    (i) a second optical window for receiving said optical signal from said first optical window together with an optical transducer for converting the optical signal to an electrical signal,
    (ii) a radiofrequency power transmitter for converting electricity into the radiofrequency energy and transmitting the radiofrequency energy to the radiofrequency power receiver; and
  (c) a control unit for providing the electricity to the radiofrequency power transmitter, and for receiving the electrical signal from the optical transducer having
    (i) a microprocessor within the control unit for analyzing the electrical signal by comparison to a threshold,
    (d) an actuator for receiving an alarm signal from said microprocessor when said electronic signal exceeds said threshold and diverting said vegetables to said second tension blade grid.

18. The apparatus as recited in claim 17, wherein said acoustic emission sensor has a frequency in a range greater than 100 kHz.

19. An apparatus for detecting severance of a part, comprising:
  (a) a sensor unit having
    (i) an acoustic emission sensor acoustically coupled to said part for receiving acoustic energy from said part into said acoustic emission sensor during use of said part, and converting said acoustic energy into a first electrical signal, said acoustic emission sensor detecting acoustic energy,
    (ii) an optical signal generator for receiving said first electrical signal and generating an optical signal,
    (iii) a first optical window for transmitting the optical signal from the sensor unit,
    (iv) a radiofrequency power receiver for receiving radiofrequency energy and converting the radiofrequency energy to electricity for operating the acoustic emission sensor and the optical signal generator;
  (b) a transmit/receive station spaced apart from said sensor unit having
    (i) a second optical window for receiving said optical signal from said first optical window together with an optical transducer for converting the optical signal to an electrical signal,
    (ii) a radiofrequency power transmitter for converting electricity into the radiofrequency energy and transmitting the radiofrequency energy to the radiofrequency power receiver; and
  (c) a control unit for providing the electricity to the radiofrequency power transmitter, and for receiving the electrical signal from the optical transducer having
    (i) a microprocessor within the control unit for analyzing the electrical signal by comparison to a threshold.

20. The apparatus as recited in claim 19, wherein said acoustic emission sensor has a frequency in a range greater than 100 kHz.

\* \* \* \* \*